United States Patent
Dannemiller et al.

(10) Patent No.: US 10,904,248 B2
(45) Date of Patent: Jan. 26, 2021

(54) PERSISTENT LINKED SIGN-IN FOR GAMING CONSOLES

(71) Applicant: Microsoft Technology Licensing, LLC, Redmond, WA (US)

(72) Inventors: Samuel J. Dannemiller, Redmond, WA (US); Michelle Larez Mooney, Kent, WA (US); Tina Marie Lemire, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 329 days.

(21) Appl. No.: 15/718,277

(22) Filed: Sep. 28, 2017

(65) Prior Publication Data

US 2018/0359246 A1    Dec. 13, 2018

Related U.S. Application Data

(60) Provisional application No. 62/517,556, filed on Jun. 9, 2017.

(51) Int. Cl.
| | |
|---|---|
| *G06F 7/04* | (2006.01) |
| *G06F 15/16* | (2006.01) |
| *H04L 29/06* | (2006.01) |
| *A63F 13/23* | (2014.01) |
| *A63F 13/79* | (2014.01) |

(52) U.S. Cl.
CPC .......... *H04L 63/0876* (2013.01); *A63F 13/23* (2014.09); *A63F 13/79* (2014.09); *H04L 63/083* (2013.01)

(58) Field of Classification Search
CPC .... H04L 63/0876; H04L 63/083; A63F 13/23; A63F 13/79
See application file for complete search history.

(56) References Cited

U.S. PATENT DOCUMENTS

| | | | |
|---|---|---|---|
| 6,511,378 B1 | 1/2003 | Bhatt et al. | |
| 8,719,168 B2 | 5/2014 | Murphy et al. | |
| 8,727,882 B2 | 5/2014 | Lum et al. | |
| 9,278,289 B2 | 3/2016 | Bannister et al. | |
| 9,579,567 B2 | 2/2017 | Garcia et al. | |
| 2009/0075687 A1* | 3/2009 | Hino | A63F 13/79 |
| | | | 455/517 |
| 2009/0300168 A1* | 12/2009 | Guo | G06F 21/73 |
| | | | 709/224 |

(Continued)

OTHER PUBLICATIONS

"XboxConsole", Retrieved from <<https://xboxconsole.codeplex.com/documentation>>, Retrieved Date: Jun. 12, 2017, 31 pages.

*Primary Examiner* — Darshan I Dhruv

(57) ABSTRACT

Gaming console user sign-in systems, methods, and services are provided herein. In one example, a user device, such as a gaming console, detects a connection event for a user input device and responsively determines a device identifier provided by the user input device associated with the connection event. The method includes linking a user identity for use on the user device to the device identifier, and persisting the linking between the user identity and the device identifier over more than one power cycle of the user device for sign-in of the user identity on the user device based on subsequent connection events involving the user input device.

19 Claims, 5 Drawing Sheets

(56) References Cited

U.S. PATENT DOCUMENTS

| | | | |
|---|---|---|---|
| 2013/0130800 A1* | 5/2013 | Sirilux | A63F 13/31 463/37 |
| 2013/0167208 A1* | 6/2013 | Shi | H04L 63/10 726/5 |
| 2014/0207672 A1* | 7/2014 | Kelley | H04L 63/0876 705/42 |
| 2014/0208389 A1* | 7/2014 | Kelley | H04L 63/08 726/4 |
| 2014/0213349 A1 | 7/2014 | Lin et al. | |
| 2014/0289824 A1* | 9/2014 | Chan | G06F 9/54 726/5 |
| 2014/0329603 A1* | 11/2014 | Goh | G06F 21/44 463/42 |
| 2015/0273337 A1* | 10/2015 | Crowley | A63F 13/77 463/29 |
| 2016/0301719 A1 | 10/2016 | Barjonas et al. | |

* cited by examiner

PERSISTENT LINKED SIGN-IN FOR GAMING CONSOLES

RELATED APPLICATIONS

This application hereby claims the benefit of and priority to U.S. Provisional Patent Application 62/517,556, titled "CONTROLLER SIGN-IN FOR GAMING CONSOLES," filed Jun. 9, 2017, which is hereby incorporated by reference in its entirety.

BACKGROUND

User input devices, such as gaming controllers, can include various user input/controls, such as analog sticks, joysticks, thumbsticks, control sticks, proportional triggers, or other input mechanisms. These input mechanisms typically include both mechanical and electrical elements to allow for user manipulation in one or more directional axes. The user input devices can be employed in various interactive systems, such as discrete gaming consoles, computer gaming environments, portable gaming systems, and other devices and systems, which might also include aviation, military, or industrial control systems. The Microsoft Xbox® family of gaming systems are examples which can employ these user input devices, with a base system, set top box, or console configured to communicate with gaming controllers over wired or wireless interfaces.

OVERVIEW

Gaming console user sign-in systems, methods, and services are provided herein. In one example, a user device, such as a gaming console, detects a connection event for a user input device and responsively determines a device identifier provided by the user input device associated with the connection event. The method includes linking a user identity for use on the user device to the device identifier, and persisting the linking between the user identity and the device identifier over more than one power cycle of the user device for sign-in of the user identity on the user device based on subsequent connection events involving the user input device.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
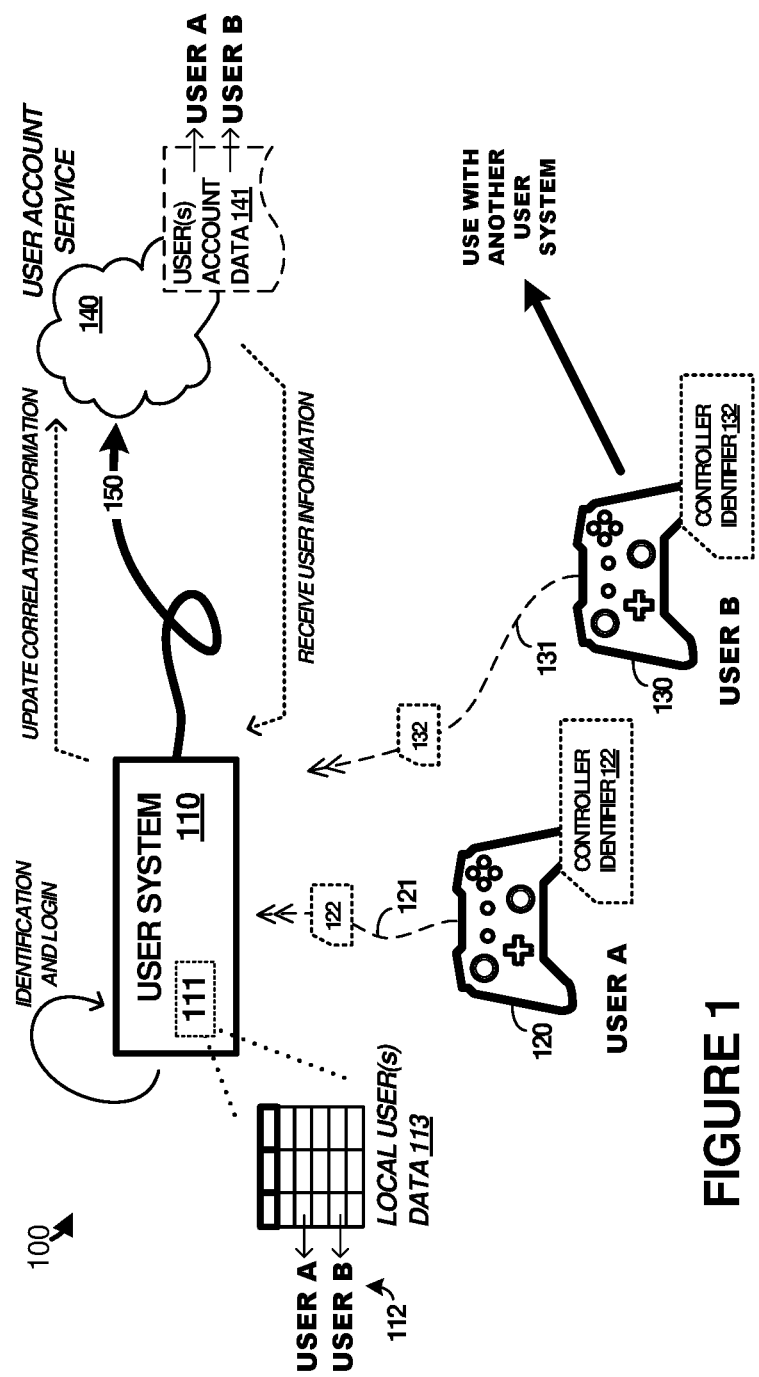
FIG. 1 illustrates a gaming console environment in an implementation.

User devices, such as computers, laptops, tablet computers, smartphones, or gaming consoles can provide user accounts, and users can sign-on by manually entering user credentials to engage in gaming features of the user device. The disclosed techniques improve the ease of user access to user accounts by employing a gaming controller or other user interface device Enhanced features herein include the capability to persistently link individual controller/device identities to user accounts on a gaming/computing device, such as a gaming console, and the capability to apply these controller identities to multiple input devices for an account. These enhancements can be implemented for more than one user account on a gaming console, with the capability to do so using the controller identities on the input devices, and the capability to use distributed computing/storage or cloud access to shift the controller identities between gaming consoles to allow access to those gaming consoles. Further enhancements include the capability to designate an input device as a trusted device with a lesser degree of sign-in information required for users as non-trusted devices. Example gaming environments include the Microsoft Xbox, Xbox One, and Xbox One 360 gaming consoles and associated controllers.

Multi-user devices, such as sharable game consoles, typically allow for multiple user accounts. In order to more fully use the gaming console, a user typically signs-in to an associated account. Often, this involves a manual process where the user has to navigate user interface elements to pick their account to sign-in, type in password or credential information, or other cumbersome processes. Some "automatic" sign-in methods exist, but these can have difficulties with users. "Biometric sign-in" requires buying an expensive or specialized biometric-compatible camera device, and associating user biometric data. Single-user "auto-sign-in" typically only works on a single user account, and occurs even if a user does not want that particular account to sign-in. "Voice sign-in" requires a microphone and sufficient voice recognition capabilities. All of these "automatic" methods also have another flaw, gaming consoles cannot easily determine which controller a user intends to use and have their input associated therewith.

The devices, systems, and processes herein achieve enhanced user sign-in and controller usage. Users can associate input devices, such as a gaming controller, to a user account. Controller-based sign-in processes are provided herein that link a particular user controller to an account for that user. This controller-to-account association allows the user to automatically sign-in on a gaming console when the input device is detected by that gaming console. This controller-to-account association persists over power cycles of the user system or gaming console, as well as over power cycles of the affected gaming controllers or user input device. Although gaming consoles are discussed herein, other user systems can be employed, such as computers, computing systems, tablet devices, smartphones, or other similar devices.

As a first example, FIG. 1 is provided. FIG. 1 illustrates gaming console environment 100 in an implementation. Environment 100 includes user system 110, gaming controllers 120 and 130, and user account service 140. User system 110 is an example of an enhanced gaming console and can be coupled to various video display devices and other user interface elements. User system 110 can communicatively couple to user account service 140 over link 150. User system 110 includes local sign-in service 111.

In operation, users will employ user input devices, such as gaming controllers 120/130, to interact with user system 110 using one or more input mechanisms, such as control sticks, directional pads, and buttons, touchpads. Further input mechanisms can be employed, such as triggers, voice controls, touchpads, touchscreens, or other input mechanisms, including combinations thereof. Gaming controllers 120/130 communicate with user system 110 over links 121/131, respectively.

Environment 100 provides for an auto-sign-in mechanism. User system 110 can associate any of gaming controllers 120/130 to particular users. These users can be identified using user accounts, user identities, or other user-specific credentials. When a particular controller is turned on and connected with user system 110, an associated user is automatically signed in. Multiple users can be automatically signed in, such as when multiple associated controllers are turned on or connected to user system 110, and all associated accounts can be automatically signed in. Selective automatic sign-in can also be employed. For example, a user might not want to automatically sign-in a particular account when a different user account is desired. Instead, a user can use a different controller with a different account associated therewith, or use an unassigned controller.

By having controllers correlated to particular user accounts, the enhanced systems herein can allow the users to roam with the controller from a first gaming console to another gaming console, and have a user account follow the user via the gaming controller. Moreover, it provides opportunities for users to customize controller settings, appearance, and functions that are tailored to particular users. Mechanisms can be employed herein that allow for selective sign-in based on which controller is desired to be signed-in for a user, and which controller is employed by a user or users. Faster sign-in processes are also achieved by allowing controller connectivity status or controller power status to trigger sign-in or sign-out processes.

In some conventional examples, for controllers that are powered on, the user can be prompted via user interface (UI) elements to manually select a user account or manually sign-in by entering user credentials into UI typing prompts. A single user might setup "auto-sign-in" which allows only a single user to sign-in when the console itself turns on. In such examples, only the first controller that turns on will be bound to that "auto-sign-in" user, and subsequent controllers that turn on will still prompt the user via UI to manually select a user account. Moreover, on conventional gaming consoles, only a single user can automatically be signed in, and only responsive to console startup. Also, when additional controllers are added to conventional consoles, UI or gaming activity will be interrupted to allow the new user to manually sign-in. With the enhanced features herein, turning on and connecting gaming controllers for use can automatically sign-in users, and can do so separately from console startup and in a background process.

Thus, on conventional consoles, there is less incentive for users to use specific controllers or travel to use other consoles with a particular controller, such as when a user visits another user residence. Users in the enhanced gaming consoles described herein maintain more of a sense of ownership of the particular controllers and can roam among various gaming consoles to be automatically or selectively signed-in according to the controller itself.

In further operations of FIG. 1, a user might power-on or "connect" controller 120 to user system 110 over link 121. A power-on event or communication connection establishment event of controller 120 over link 121 can be referred to as a controller connection 'add' event. This connection event can occur when controller 120 is powered on, user system 110 recognizes controller 120 as a compatible user input device, and adds controller 120 into a list of available user input devices that have been activated/turned on and are authorized for user input on user system 110. Connection 'add' events can include turning on controller 120 with user system 110 already in a powered/booted state, or can include turning on user system 110 with a subsequent detection of controller 120 by user system 110. Connection 'remove' events can include turning off controller 120 or user system 110. Once controller 120 is connected, user system 110 can process an identifier associated with controller 120 for pairing with a user account in accordance with persisted linking or correlation information.

If no user account is correlated with controller 120, then a user can be prompted to begin a process to associate, link, or otherwise correlate controller 120 with a user account. This association, linking, or correlation is persisted over power cycles of user device 110 and controller 120. Once controller 120 has been associated with a user account, then responsive to a connection 'add' event of controller 120, that user can be automatically signed-in to a user account employed on user system 110.

The user account and associated correlation might be persisted locally on user system 110 in local sign-in service 111. When persisted locally on user system 110, the user account correlations to controller identifiers can allow automatic sign-in of user accounts when user system 110 lacks connectivity to a network or the Internet. Thus, not only automatic "online" sign-in but automatic "offline" sign-in can be established based at least on connection events of controller devices that correspond to correlation information persisted in user system 110. The persistence can be established by storing correlation information between user accounts and controller identifiers in a storage device of user system 110 or within a storage device of individual controllers. The correlation information might also be stored in user account service 140 in a distributed storage system or cloud-based service. If not stored or cached locally in user device 110, user account information and controller-account correlations can be transferred over link 150 from service 140 to local sign-in service 111. The use of service 140 can allow a user to roam from user system 110 to another user system, such as when a user visits a friend who has a separate gaming console. In roaming situations, once the user account information or controller-account correlations have been transferred to a local sign-in service 111 of a local user system 110, then the user account information or controller-account correlations can be persisted locally to the associated user system for use in offline scenarios.

Controller 120 can store a controller identifier which might be uniquely assigned to a particular controller. This controller identifier can be static and unique to the particular controller. This controller identifier can be stored in a computer-readable medium, a storage device, a non-transitory storage device, or hard-coded/hard-wired into a read-only memory device or jumper-based element. Responsive to connecting to user system 110, controller 120 provides this controller identifier 122 to user system 110. User system 110 can use the controller identifier as an index into corresponding user identities or user account information, such as local user(s) data 113 that comprises a data structure organized according to user identities or controller identifiers.

Any number of controllers can be associated with user accounts, and user device 110 can handle association with any controller that a user might want to use. For example, another user might want to use controller 130 and subsequently pair controller 130 with user system 110. Controller identifier 132 can be provided to local sign-in service 111 in user system 110. If a correlation or linking between controller identifier 132 and a user identifier or user account is found in local user data 113, then user system 110 can sign-in the user associated into user system 110 (or into associated user/gaming software) with the user identity or user account.

If a correlation or linking between controller identifier 132 and a user identifier or user account is not found in local user data 113, then user system 110 can check with user account service 140 for corresponding user information. If user information is found by user account service 140, then this user information can be transferred to user system 110 for use locally. Once the user information is transferred to user system 110 for use locally, then that user can be automatically signed-in to user system 110 for use in games, software, or other applications based on the controller identifier. Various user authentication can also occur during these processes, such as secure authentication with an authentication service or credentials-based login service. If no user information is present for a particular controller in both local user data 113 and user account data 141 of user account service 140, then various UI processes can allow a user to correlate or link a gaming controller to a user account or user identifier, among other actions.

Thus, each user can have a user account identified by a user identifier or other user identity stored in correlation with one or more controller identifiers by local sign-in service 111. Moreover, this correlation can be stored by user account service 140, such as in user account data 141. This correlation is persisted in user system 110 so that the correlation is maintained over one or more power cycles of user system 110. As discussed in the operational figures below, this correlation can be employed to automatically sign-in a user into user system 110 responsive to a connection event for a corresponding input device. Input devices, such as gaming controllers, can have unique identifiers associated therewith, and those unique identifiers can be used to initiate user auto-sign-in processes on user system 110, responsive to power on of the gaming controllers or connecting the gaming controllers with user system 110. When a controller is presented to user system 110, then local sign-in service 111 can perform a sign-in process for the user associated with the controller based on the unique identifier of the controller.

In further examples, a user can have multiple controllers associated with a single user account, and when any of those controllers are connected with the gaming console, then the user can be automatically signed-in to the console. Moreover, when controllers include non-volatile storage space, user information might be stored or cached in the controller as an alternative or in addition to storage in local user data 113 or user account service 140. In this manner, even if a user system did not have connectivity to user account service 140, a user might be able to roam with their corresponding user information stored within the controller itself.

In yet further examples, a "trusted controller" scheme might be used, where controllers might be designated as trusted controller and non-trusted controllers. The trusted controllers might include further elements to establish trust with the user system, such as secure chipsets, secure memory, encryption keys, coded identifiers, or other elements. A secure or encrypted authentication process might be prompted for a controller upon an initial pairing or linking to a user account to authenticate a controller as genuine or having an authentic controller identifier, as well as to establish a corresponding authentic user identity in some cases. Responsive to establishing a controller as 'trusted', a subsequent connection 'add' event with a "trusted controller" can allow a user to bypass certain security measures, such as a passkey, and automatically sign-in a user identity or user account that has been correlated to the trusted controller. When a controller has established trust, the corresponding user might not be prompted for a passkey, such as an N-digit code, pin, touch/movement pattern, password, or biometric identifier, and will be automatically signed in, even if the user account normally requires a passkey to sign-in. Non-trusted controllers might be configured to still prompt for confirmation via a passkey responsive to a connection event and/or pairing event even if a user identity or 'login' is persistently correlated to the non-trusted controller. However, it should be understood that the automatic sign-in examples herein might be configured to not prompt for passkeys regardless of the trusted/non-trusted controller scheme.

Thus, in the examples of using trusted controllers, user system 110 can establish controller 120 as a trusted user input device based at least on the controller identifier of controller 120 and an authentication process. An indication of this trusted status can be persisted in correlation with the controller identifier and associated user identity. Responsive to connection add events involving controller 120, user system 110 can determine, based at least on the controller identifier, that controller 120 comprises a trusted user input device, and subsequently bypass a passkey or other additional user credentials for sign-in of the user identity associated with the controller identifier of controller 120. This controller identifier can comprise a secure identification code unique to controller 120, and stored within storage elements of controller 120. These storage elements might comprise secure or encrypted storage elements that allow for authentication of the identification code to establish controller 120 as a trusted user input device. Authentication systems external to user system 110 might be employed to establish controller 120 as a trusted user device based on the stored secure identifier, and this process might only occur during a first or initial pairing or linking event for controller 120.

Returning to a discussion of the elements of FIG. 1, user system 110 comprises an end user system, such as gaming systems, gaming consoles, terminals, computing devices, tablet devices, smartphones, personal computers, servers, cloud-based systems, distributed computing platforms, and the like. Users, such as users of a gaming console, entertainment platform, computing system can interact with user interface elements of user system 110 via user interface devices 120/130 or other user interface elements. User system 110 can include processing systems, memory systems, network interface equipment, user interface elements, audio and graphics processing systems, video handling systems, as well as user account services, such as local sign-in service 111.

Controller 120 comprises a gaming controller in some examples. However, the discussion herein is not limited to gaming controllers. Any user input devices might instead be employed using the enhanced techniques and services discussed herein. For example, controller 120 might instead comprise user input devices with various user input/control mechanisms, such as joysticks, thumbsticks, or other input mechanisms. Controller 120 might instead comprise mouse input devices, keyboard input devices, touchscreen input devices, touchpad input devices, video input devices, audio input devices, or other user input devices. Controller 120 can also include output devices, such as built-in screens, speakers, headphones, indicator lights, or other output elements. In some examples, controller 120 includes one or more non-transitory computer-readable memory/storage devices to persist controller identifiers, user account information, user data, or controller-account correlation information, among other information and data.

User system 110 can receive user input from various input devices discussed herein, such as one or more gaming controllers, keyboards, mouse devices, touch screens, touch panels, or other user input devices which can be used in combination with voice input, visual input, or other user input methods. This user input can be detected by user system 110 and translated into actions which can be interpreted by further elements of user system 110, such as local sign-in service 111.

Local sign-in service 111 establishes relationships or correlations between controller identifiers and user accounts. These correlations can be locally cached or locally persisted in storage of user system 110, as well as persisted with user accounts that are maintained over a remote storage service, such as a cloud-based or distributed computing/storage platform indicated for user account service 140. Multiple user accounts can be maintained by local sign-in service 111, and multiple gaming controllers can be associated with these accounts. Local sign-in service 111 can communicate with remote user account service 140 to retrieve user account information, perform authentication or sign-in processes, and transition user account information from one user device to another user device, among other features. Local sign-in service 111 can include hardware and software elements, such as account processing elements, storage devices, software applications, virtualized applications, or other components. In many examples, local sign-in service 111 is employed to selectively sign-in users via correlations with controller identities in a gaming environment provided by a gaming service associated with user system 110.

Local user data 113 is user information that is stored locally to user system 110 by local sign-in service 111, and can also be stored by user account service 140 in user account data 141. Local user data 113 can include user identity correlations to controller identifiers, user preferences, user settings, user profiles, user social media information, user customizations for controllers or games, saved games, user game scores and achievements, media files, links to user data in cloud storage locations, account/purchasing information, usage records/logs, crash reports, or other information.

Links 121/131 each comprise a gaming controller link, which might comprise one or more wired or wireless communication links. Links 121/131 can each comprise various logical, physical, or application programming interfaces. Example links can use metal, glass, optical, air, space, or some other material as the transport media. Links 121/131 can each use various protocols and formats, such as universal serial bus (USB), proprietary communication signaling, Internet Protocol (IP), Ethernet, transmission control protocol (TCP), WiFi (IEEE 802.11), Bluetooth, near-field communication (NFC), infrared communications, other wired or wireless data interfaces, or some other communication format, including combinations, improvements, or variations thereof. Links 121/131 can each include direct links or may include intermediate networks, systems, or devices, and can include a logical network link transported over multiple physical links.

Link 150 can comprise one or more communication links, such as one or more wireless or wired links. Link 150 can comprise various logical, physical, or application programming interfaces. Example links can use metal, glass, optical, air, space, or some other material as the transport media. Link 150 can use various protocols and formats, such as Internet Protocol (IP), Ethernet, transmission control protocol (TCP), hybrid fiber-coax (HFC), WiFi, Bluetooth, other wired or wireless data interfaces, or some other communication format, including combinations, improvements, or variations thereof. Link 150 can include direct links or may include intermediate networks, systems, or devices, and can include a logical network link transported over multiple physical links. Link 150 can include routers, switches, bridges, traffic handling nodes, and the like for transporting traffic among endpoints.

Figure 2:
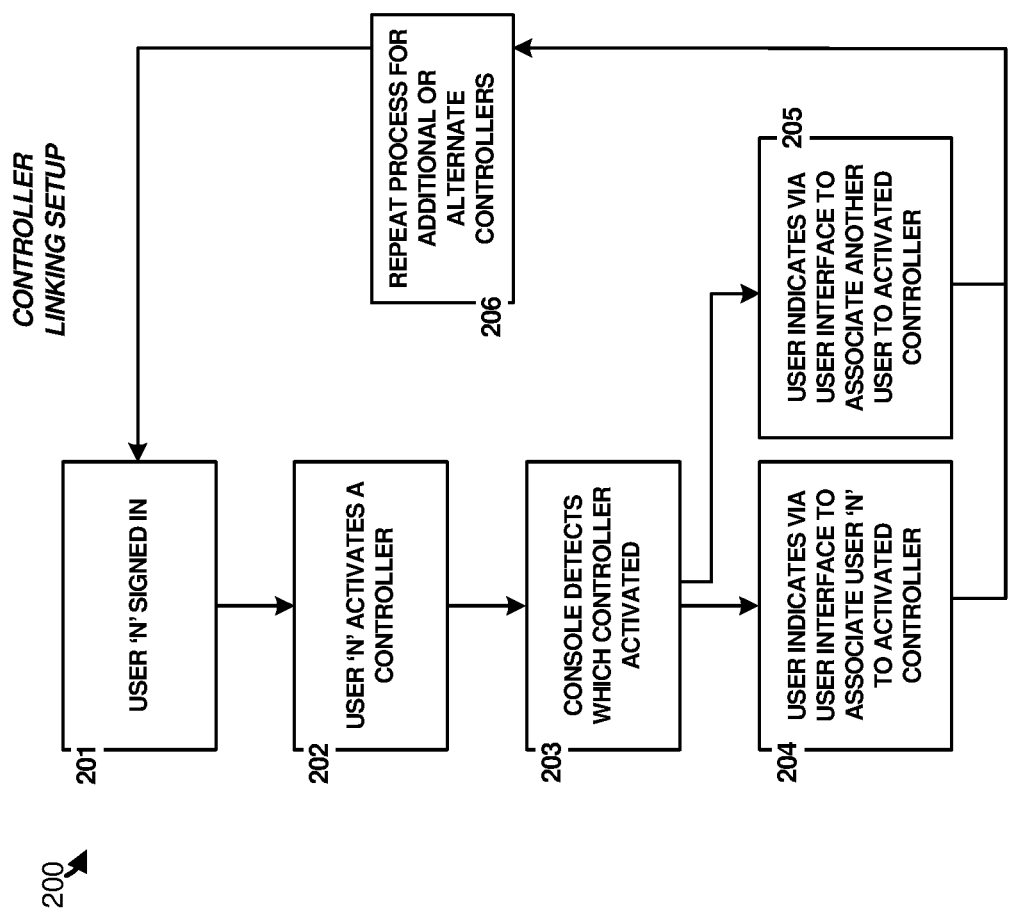
FIG. 2 illustrates operation of a gaming console environment in an implementation.
Figure 3:
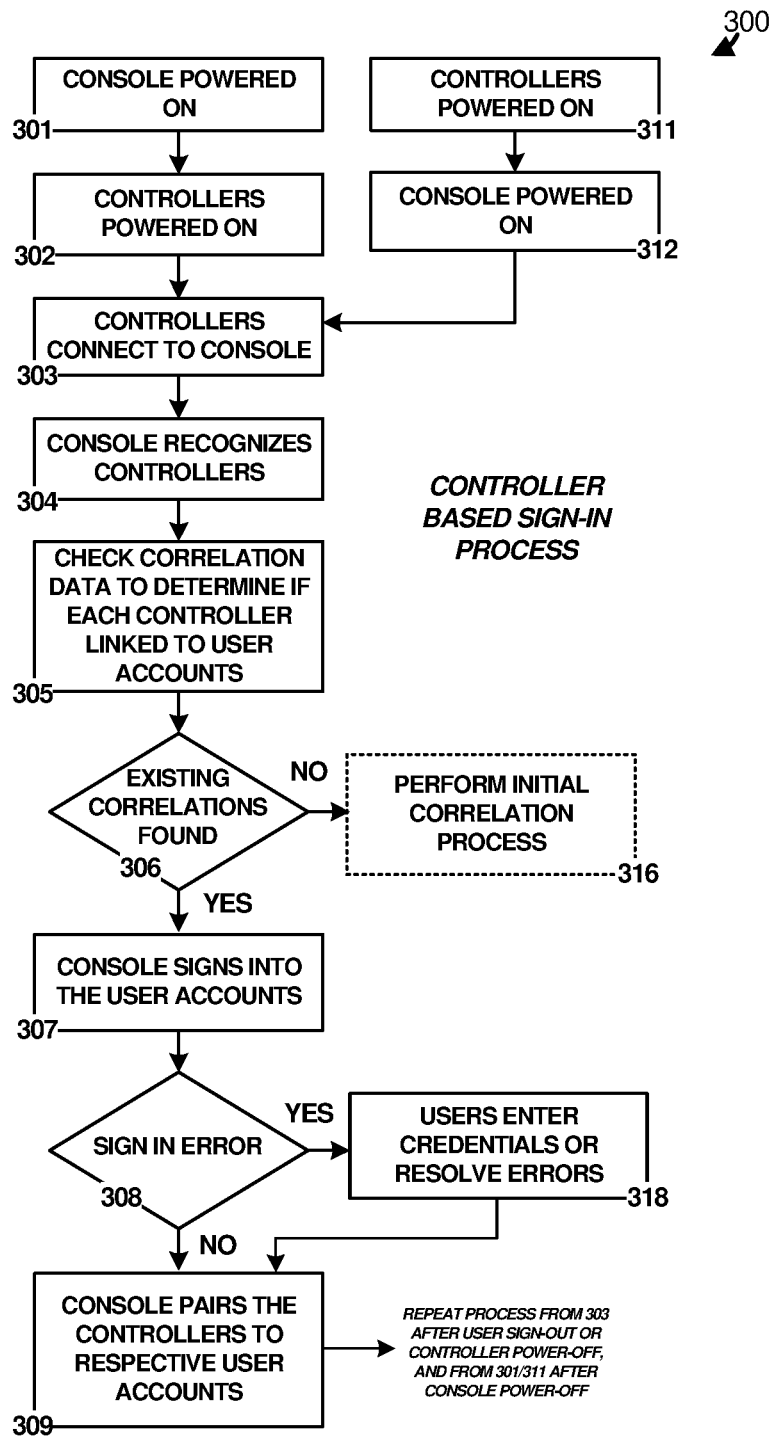
FIG. 3 illustrates operation of a gaming console environment in an implementation.

Turning now to further operational examples of the elements of FIG. 1, FIGS. 2-3 are presented. FIG. 2 discusses operations for linking a gaming controller to a user account or user identifier, to establish which user should be signed-in or logged in responsive to a connection event of the gaming controller to an associated gaming console. FIG. 3 discusses operations for pairing a gaming controller once an initial linking has already been established.

A 'pairing event' establishes which user account or user identity should be associated with the gaming controller for use of the gaming console responsive to connection 'add' events, and likewise which user identity should be associated with various user input received via the gaming controller. This pairing event might be initiated responsive to a connection add event using persisted controller identifier correlations to user accounts. The persistent linking or correlation establishes correlation information to be used in these pairing events to perform a user sign-in automatically based on the correlation information. In the various operations of FIGS. 2 and 3, a controller might be linked and paired to the same user. A controller might instead be persistently linked to one particular user, and currently paired to another particular user. In further examples, a controller can be persistently linked to a particular user, and not yet paired to a user. A controller can also be persistently linked to no user, yet be paired to a current user. A controller can be linked to no user, while also paired to no user.

FIG. 2 is a flow diagram illustrating several example operations 200 for initial linking or correlation among user identities and controller identifiers in a gaming system environment. The operations of FIG. 2 can be performed in the context of elements of FIG. 1, such as user system 110, and controllers 120/130, although elements from FIGS. 4-5 can instead be employed. In FIG. 2, user system 110 detects (201) when any giver user 'n' is signed into user system 110, such as by having logged into a user account or other software/gaming authentication service provided on user system 110. Subsequent to the user sign-in or login, that particular user might activate (202) a gaming controller for use with user system 110, such as gaming controller 120. This activation can include powering on the gaming controller, connecting over a communication link between the gaming controller and user system 110, or other processes.

Responsive to the controller activation, the gaming console, such as user system 110, detects (203) which controller was activated. When many or multiple controllers are activated, or are already active, then user system 110 can select among the controllers for further processing. For a new controller, such as one not previously activated with user system 110 or another user system, this process can include selecting this new controller for further processing. This selection might include selecting the most recently powered-on controller, or a UI element can present user selections for selecting a particular controller. When multiple controllers have been activated or connected, then this process can be repeated for each of the controllers. Operation 206 illustrates this repeating of the process in FIG. 2 for additional or alternate controllers for the same user or for other users.

User system 110 then presents user interface elements to allow the user to indicate (204) options to associate or correlate that user to the selected or activated controller. This correlation links a particular user (via an associated user identity or user account) to a particular gaming controller (via the controller identifier provided during connection). The correlation is stored within local user data 113 and persists over more than one power cycle of user system 110. Once persisted, further connection events for the same gaming controllers can initiate automatic sign-in processes for the linked users. User system 110 can also indicate (205) via user interface elements to associate another user to the activated controller instead of the user that is signed in presently, or to clear existing correlations. This can be useful to link or correlate other controllers to friends, family, or other users in managed environments.

FIG. 3 is a flow diagram illustrating several example operations 300 for sign-in using linked controllers. The operations of FIG. 3 can be performed in the context of elements of FIG. 1, such as user system 110, and controllers 120/130, although elements from FIGS. 4-5 can instead be employed. In FIG. 3, one or more gaming controllers are connected (303) to user system 110, which comprises a gaming console in this example. However, the process to begin the detection of connected gaming controllers might occur via one of two pathways. In a first example, user system 110 is powered on (301) and gaming controllers are subsequently powered on (302). In a second example, the controllers are first powered on (311) which prompts user system 110 to power on (312). Regardless of the process by which user system 110 is powered on and controller connection initiated, the controller connection is detected by user system 110 (303).

In some examples, the connection is over a wireless link and the gaming controller is detected upon communications established between user system 110 and the controller. In other examples, the connection is over a wired link and the gaming controller is detected upon power up of user system 110 (if already connected via a wired connection) or upon plugging in or physical connection of the controller to an associated port of user system 110. Once connected, via any of the example processes above, user system 110 can recognize (304) the controllers as suitable for use in with user system 110 or for use in further operations related to automatic sign-in for users. This can be based on a connection type for the communication link, a controller model or type, or other factors.

During the connection or pairing process between the gaming controller and user system 110, a controller identifier is provided to user system 110 by the gaming controller. This controller identifier can be a static identifier that is associated with a particular gaming controller, such as a unique number, serial number, secure identification number, or other identifiers as discussed herein. This controller identifier can be provided over an associated link between the gaming controller and user system 110, such as over associated ones of links 121/131 in FIG. 1.

User system 110 checks (305) correlation data, such as local user data 113, to determine if each controller that has just been attached or connected to user system 110 is linked to associated user accounts. This correlation data comprises one or more data structures that relate indicators of user identities or other user account identifiers to controller identifiers. The controller identifiers can be used as a lookup value into the data structure which then indicates a corresponding user identity or indication of a lack of correlated user identity. User system 110 performs this correlation check and if existing correlations are found for the associated controller identifiers (306), then user system 110 signs into gaming software or other software executed on user system 110 with user credentials of the associated/linked user accounts. These user credentials might include a username for a user that corresponds to the user identity. When only a username is persisted in correlation with a gaming controller identifier, then a user might be prompted to enter a passkey, password, pin, or other secret identifier to complete a sign-in process for that username. When both a username and password are persisted in correlation with a gaming controller identifier, then a user might not be prompted for any further credential entry. The secure sign-in processes discussed above might be employed when both the username/password as persisted in correlation with a gaming controller.

If existing correlations are not found, then operation 316 can provide for initial setup of a correlation or linking among user identities and gaming controller identifiers, such as described in FIG. 2. If sign-in errors (308) are encountered during the automated sign-in process using the correlated user identities, then users can be prompted to resolve these errors (318) by re-entering user credentials or other user information. These re-entered credentials can be persisted by user system 110 for further automated sign-in processes. However, if no sign-in error is encountered, then the particular users correlated to the particular gaming controllers are signed in, and the pairing (309) of the controllers is completed.

A user can employ the controller or controllers during usage of user system 110, such as to engage in user applications, gaming applications, games, or other activities. A user can sign out of an account on user system 110, such as to halt gameplay, switch accounts, or allow another user to use user system 110. The associated controller can be powered off as well. This power-off process might occur after the sign-out process, or might prompt the sign-off process. Once the user account has been signed out and the controller has been powered off, a subsequent power-on of the controller can initiate an automatic sign-in of that same user, based on the persisted correlation information between the controller identifier and the user account. The process can be repeated from operation 303 after user sign-out or controller power-off, and can be repeated from operations 301/311 after console power-off. The persisted correlation information provides for automatic sign-in for users based on connection events of associated controllers or other user devices.

Figure 4:
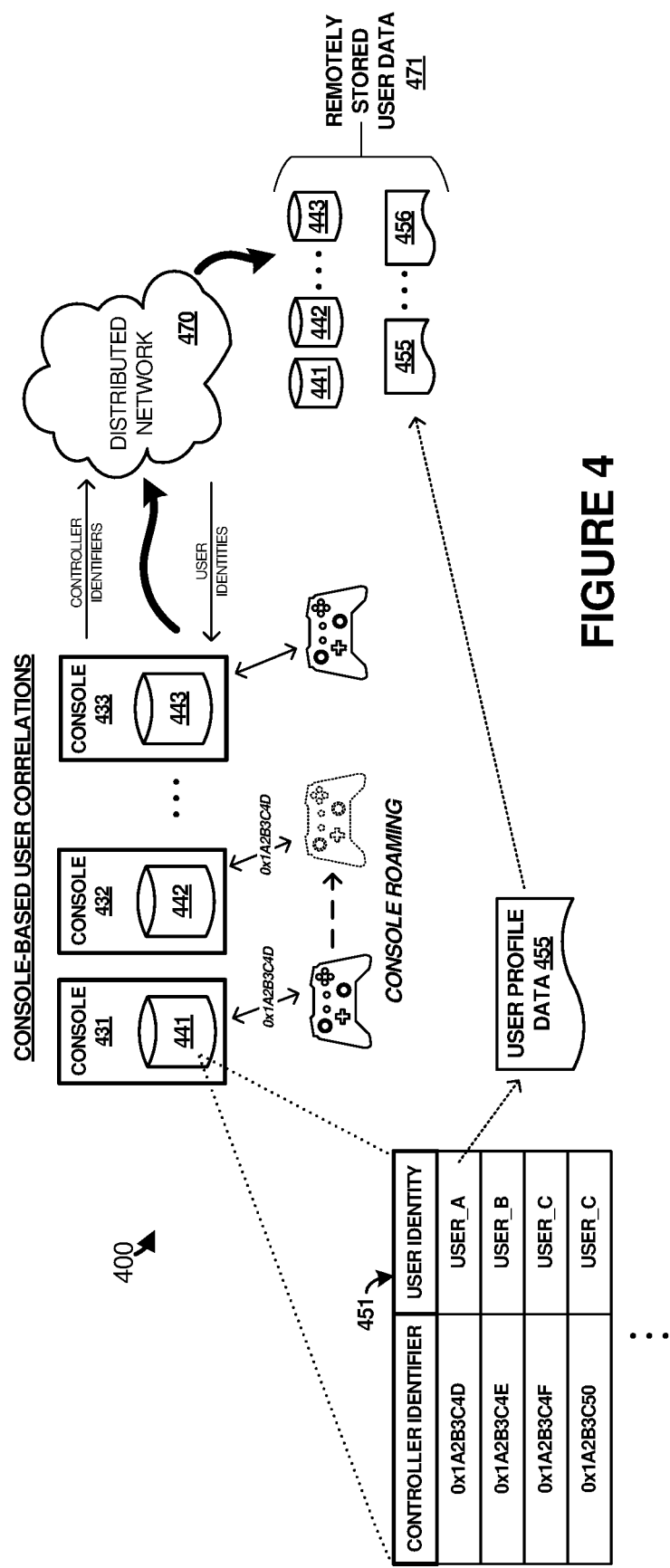
FIG. 4 illustrates a gaming console environment in an implementation.

Turning now to a discussion of controller/user roaming among gaming consoles, FIG. 4 is provided. FIG. 4 is a system diagram illustrating gaming environment 400. Environment 400 includes a plurality of gaming consoles 431-433, which might each be located in different geographic locations. Each of gaming consoles 431-433 can communicate over one or more associated network links with distributed network 470. Distributed network 470 provides access to one or more storage systems that are remotely located from the gaming consoles, as indicated by remotely storage user data 471 in FIG. 4.

Each of gaming consoles 431-433 comprise an associated local data storage device 441-443 used for storing user data, user profile information, gaming information, and other information. Moreover, local data storage devices 441-443 include one or more data structures that store correlations or linkings among controller identifiers and user identities. These correlations can be used to sign-in users associated with the user identities upon connection events of the gaming controllers associated with the controller identifiers. Example data structure 451 is shown in FIG. 4, comprising a table with entries of a first column corresponding to controller identifiers and entries of a second column corresponding to user identities. The controller identifiers can be any identifier, numerical, alphanumerical, or otherwise. The user identities can be any identity associated with users, user account IDs, usernames, or other user-based delimiter. The example hexadecimal numbers for controller identifiers and the example alphanumeric user identities in FIG. 4 are merely representative examples.

Each user identity can be associated with further data for that user. For example, user profile data 455 can be stored by each storage system and be connected to the particular user identities. This user profile data can include user preferences, user settings, user profiles, user social media information, user customizations for controllers or games, saved games, user game scores and achievements, media files, links to user data in cloud storage locations, account/purchasing information, usage records/logs, crash reports, or other information.

Typically, each gaming console will store the user profile data, user identifiers, controller identifiers, and correlation/linkings within associated storage devices and data structures. In addition to the local storage at each gaming console, a distributed or cloud-based computing/storage system can be employed in environment 400 to provide additional storage and enhanced operations. Remotely stored use data 471 can comprise the various data stored by each gaming console, and particularly the correlations among user identities and controller identifiers can be stored within elements 471.

Initially, a first user can perform a linking process with a first controller at a first gaming console, such as shown in FIG. 4 for console 431 with the pictured controller. A controller identifier, such as "0x1A2B3C4D" for the pictured controller, can be provided responsive to a connection event or connection process to establish a communication link among the controller and the gaming console. This controller identifier can be persisted in data structure 451 for repeated sign-in of an associated user identity or user account responsive to power on of the gaming console or connection of the gaming controller. This persistence is configured to remain valid over many power cycles of the gaming console as well as the gaming controller. Thus, if gaming console 431 is powered down or placed into a standby state for which a user account is signed out or not presently active, the correlation between the user identity and the gaming controller identifier remains established. Once the gaming system is powered on again and the associated controller is connected or coupled over a communication link, then the gaming system can process the provided controller identifier against correlation data included in data structure 451 to determine which user identity corresponds to the controller identifier. This user identity can then be used by the gaming console to sign in a user or user account that corresponds to the user identity. In some cases, the user identity is a username and can directly be used to sign in.

However, a user might want to take an associated gaming controller to another location or for use on another gaming console, such as when visiting a friend or family member, or participating in a gaming event, tournament, or meet-up. Moreover, the user might have more than one gaming console but still desires to employ a common controller among the various gaming consoles. This is referred to as 'roaming' herein, and the enhanced features provide for roaming of a user among various gaming consoles while maintaining the persistent correlation between the gaming controller and the user identity.

Distributed network 470 and associated remotely stored user data 471 can provide for this roaming behavior. Specifically, the user data, correlations, and other information stored locally by each gaming console might be copied or otherwise mirrored into data 471. An account can be created for each user identity, and this account can include storage features to store various information mentioned herein for the user as well as one or more correlations or linkings between gaming controller identifiers and user identities. These correlations can be provided to other gaming consoles upon connection events detected at those other gaming consoles.

For example, a user might roam a gaming controller associated with that user identity for use on another gaming console. In FIG. 4, a controller with identifier "0x1A2B3C4D" is initially connected and linked to a user identity on gaming console 431. That same user might roam to gaming console 432, and subsequently connect or establish a communication link among the controller and gaming console 432. Gaming console 432 can check locally stored correlation data to determine if that controller identifier, namely "0x1A2B3C4D" has been linked in the gaming console. Since the user is roaming, the correlation might not be found local to gaming console 432, and responsively gaming console 432 can issue one or more requests to distributed network 470 to check the various data 471 for correlations existing among controller identifier "0x1A2B3C4D" and any user identities. If correlations are found, then these correlations can be provided to gaming console 432 and the associated user identity can be employed to sign into the user account previously established for gaming console 431. In this manner, a user can migrate the controller-to-user persistent correlation among more than one gaming console. The 'cloud' or distributed storage service provided by elements 470-471 can enable this roaming by having a common repository for user data and these correlations. In other examples, gaming consoles might directly provide the user data and correlations directly or in a peer-to-peer fashion instead of using the intermediary cloud systems. In yet further examples, the gaming controllers might include storage space into which the user data and persistent correlations can be stored and provided when roaming onto other gaming consoles.

Thus, a user might be able to have a corresponding user identity, user account, username, or other user credentials and account information coupled to a particular gaming controller. This user can then roam to other gaming systems and have that information and user-controller correlation persisted even over power cycles of local and remote gaming consoles. Each gaming console can have any number of controllers linked to any number of user identities.

Controllers can have persisted correlations or linkings at multiple gaming consoles simultaneously.

Figure 5:
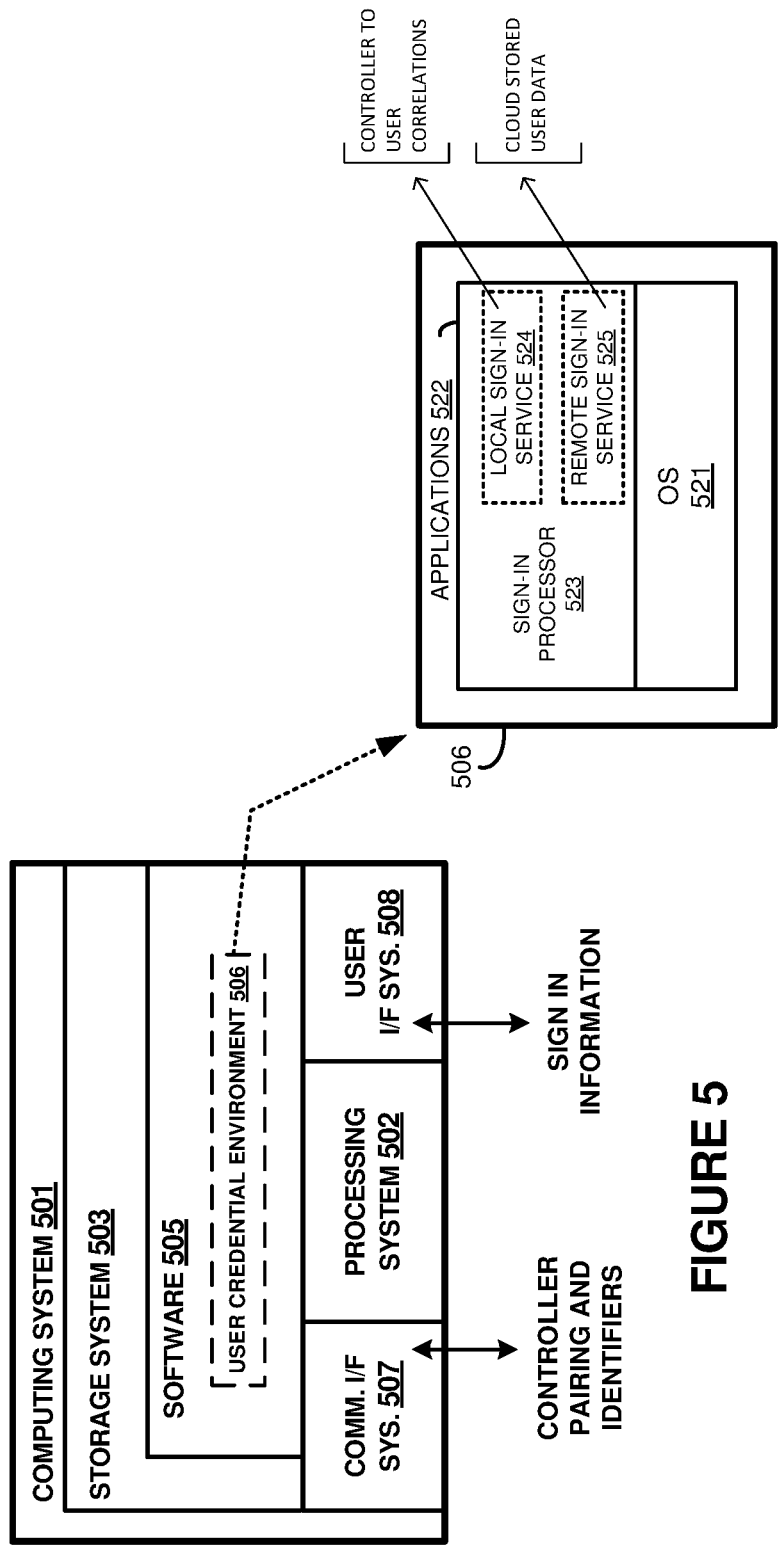
FIG. 5 illustrates an example computing platform for implementing any of the architectures, processes, methods, and operational scenarios disclosed herein.

FIG. 5 illustrates computing system 501 that is representative of any system or collection of systems in which the various operational architectures, scenarios, and processes disclosed herein may be implemented. For example, computing system 501 can be used to implement any of user system 110 of FIG. 1 and gaming consoles 431-433 of FIG. 4. Examples of computing system 501 include, but are not limited to, gaming consoles, gaming systems, computers, smartphones, tablet computing devices, laptops, desktop computers, hybrid computers, rack servers, web servers, cloud computing platforms, cloud computing systems, distributed computing systems, software-defined networking systems, and data center equipment, as well as any other type of physical or virtual machine, and other computing systems and devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 508. Processing system 502 is operatively coupled with storage system 503, communication interface system 507, and user interface system 508.

Processing system 502 loads and executes software 505 from storage system 503. Software 505 includes user credential environment 506, which is representative of the processes discussed with respect to the preceding Figures. When executed by processing system 502 to enhance user sign-in processes on gaming consoles, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and processing circuitry that retrieves and executes software 505 from storage system 503. Processing system 502 may be implemented within a single processing device, but may also be distributed across multiple processing devices, sub-systems, or specialized circuitry, that cooperate in executing program instructions and in performing the operations discussed herein. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for enhanced user sign-in processes on gaming consoles, among other operations.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software or other application software, in addition to or that include user credential environment 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced user sign-in processes on gaming consoles. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

User credential environment 506 includes one or more software elements, such as OS 521 and applications 522. These elements can describe various portions of computing system 501 with which gaming consoles, user systems, storage systems, or control nodes, interact. For example, OS 521 can provide a software platform on which application 522 is executed and allows for enhanced user sign-in processes on gaming consoles.

In one example, local sign-in service 524 provides for correlations between gaming controllers and user identities for automated sign-in of user accounts using controller connection events. Local sign-in service 524 persists correlations among user accounts and gaming controllers over power cycles of an associated gaming console or user device. Local sign-in service 524 allows users to establish pairings or correlations among user accounts and gaming controllers through various user interface elements, graphical or otherwise. Local sign-in service 524 can interface with remote sign-in service 525 to retrieve correlations among user accounts and gaming controllers from an external storage or computing service, such as a cloud computing/storage platform or a distributed computing/storage platform, among others. Remote sign-in service 525 can retrieve these correlations that are established on other gaming consoles or user systems and stored in a remote storage system. Remote sign-in service 525 can retrieve user data, user profile data, saved game states, saved user preferences, or other user information as well from a remote storage system.

Communication interface system 507 may include communication connections and devices that allow for communication with other computing systems or storage systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange packetized communications with other computing systems or networks of systems, such as metal, glass, air, or any other suitable communication media.

User interface system 508 may include gaming controllers, a keyboard, a mouse, a voice input device, or a touch input device for receiving input from a user. Output devices such as a display, speakers, web interfaces, terminal interfaces, and other types of output devices may also be included in user interface system 508. User interface system 508 can provide output and receive input over a network interface, such as communication interface system 507. In network examples, user interface system 508 might packetize audio, display, or graphics data for remote output by a display system or computing system coupled over one or more network interfaces. Physical or logical elements of user interface system 508 can provide alerts or anomaly informational outputs to users or other operators. User interface system 508 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems or storage systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1: A method of providing user sign-in on user devices, the method comprising on a user device, detecting a connection event for a user input device and responsively determining a device identifier provided by the user input device associated with the connection event. The method includes linking a user identity for use on the user device to the device identifier, and persisting the linking between the user identity and the device identifier over more than one power cycle of the user device for sign-in of the user identity on the user device based on subsequent connection events involving the user input device.

Example 2: The method of Example 1, further comprising detecting a subsequent connection event for the user input device after an associated power cycle of the user device, and responsively receiving the device identifier provided by the user input device. The method also includes processing the device identifier against correlation data to determine that the device identifier is linked to the user identity, and performing a sign-in process on the user device for the user identity.

Example 3: The method of Examples 1-2, further comprising, responsive to further connection events of further user input devices, receiving associated device identifiers provided by the further user input devices, and processing the further device identifiers against correlation data to determine if the further device identifiers are linked to one or more user identities on the user device. The method includes, based at least on ones of the further user input devices being linked, performing sign-in processes on the user device for corresponding user identities.

Example 4: The method of Examples 1-3, further comprising, based at least on the ones of the further user input devices not being linked, prompting users to perform linking processes for the ones of the further user input devices to the corresponding user identities of the users, where the linking processes persist correlations between the ones of the further user input devices and the corresponding user identities over at least one power cycle of the user device.

Example 5: The method of Examples 1-4, further comprising, based at least on the ones of the further user input devices not being linked, communicating with one or more storage services remote from the user device to retrieve further correlation data indicating previously established links between the ones of the further user input devices and associated user identities on at least a further user device. The method includes persisting at least one of the previously established links on the user device.

Example 6: The method of Examples 1-5, further comprising transferring an indication of the linking between the user identity and the device identifier to at least a storage service remote from the user device, where the indication can be employed to perform a sign-in process on at least another user device responsive to an associated connection event for the user input device on the other user device.

Example 7: The method of Examples 1-6, further comprising, on another user device, detecting an associated connection event for the user input device and responsively receiving the device identifier provided by the user input device with the associated connection event. The method includes, on another user device, determining that the device identifier is not linked with any user identity on the other user device and responsively querying a remote storage service to retrieve correlation data indicating the linking between the user identity and the device identifier. The method includes, on another user device, performing a sign-in process on the other user device with the user identity.

Example 8: The method of Examples 1-7, further comprising establishing the user input device as a trusted user input device based at least on the device identifier of the user input device, and persisting an indication of the user input device as the trusted user input device. Responsive to at least one of the subsequent connection events involving the user input device, determining based at least on the device identifier that the user input device comprises the trusted user input device, and subsequently bypassing a passkey for sign-in of the user identity.

Example 9: A computing apparatus comprising one or more computer readable storage media, a processing system operatively coupled with the one or more computer readable storage media, and program instructions stored on the one or more computer readable storage media. When executed by the processing system, the program instructions direct the processing system to at least detect a connection event between a user input device and a user device and responsively determine a device identifier provided by the user input device, establish a correlation between a user identity on the user device and the device identifier, and persist the correlation between the user identity and the device identifier over more than one power cycle of the user device for sign-in of the user identity on the user device based on subsequent connection events involving the user input device.

Example 10: The computing apparatus of Example 9, comprising further program instructions, that when executed by the processing system, direct the processing system to at least detect a subsequent connection event for the user input device after an associated power cycle of the user device, and responsively receive the device identifier provided by the user input device. The program instructions further direct the processing system to process the device identifier against correlation data to determine that the device identifier is correlated to the user identity, and perform a sign-in process on the user device for the user identity.

Example 11: The computing apparatus of Examples 9-10, comprising further program instructions, that when executed by the processing system, direct the processing system to at least, responsive to further connection events of further user input devices, receive associated device identifiers provided by the further user input devices, and process the further device identifiers against correlation data to determine if the further device identifiers are correlated to one or more user identities on the user device. Based at least on ones of the further user input devices being correlated, the program instructions further direct the processing system to perform sign-in processes on the user device for corresponding user identities.

Example 12: The computing apparatus of Examples 9-11, comprising further program instructions, that when executed by the processing system, direct the processing system to at least, based at least on the ones of the further user input devices not being correlated, prompt users to perform linking processes for the ones of the further user input devices to the corresponding user identities of the users, where the linking processes persist correlations between the ones of the further user input devices and the corresponding user identities over at least one power cycle of the user device.

Example 13: The computing apparatus of Examples 9-12, comprising further program instructions, that when executed by the processing system, direct the processing system to at least, based at least on the ones of the further user input devices not being correlated, communicate with one or more storage services remote from the user device to retrieve further correlation data indicating previously established correlations between the ones of the further user input devices and associated user identities on at least a further user device, and persist at least one of the previously established correlations on the user device.

Example 14: The computing apparatus of Examples 9-13, comprising further program instructions, that when executed by the processing system, direct the processing system to at least transfer an indication of the correlation between the user identity and the device identifier to at least a storage service remote from the user device, where the indication can be employed to perform a sign-in process on at least another user device responsive to an associated connection event for the user input device on the other user device.

Example 15: The computing apparatus of Examples 9-14, comprising further program instructions, that when executed by the processing system, direct the processing system to at least establish the correlation between the user identity on the user device and the device identifier by at least providing a user interface on the user device to allow a user to link the user identity with the user input device corresponding to the device identifier.

Example 16: The computing apparatus of claims 9-15, comprising further program instructions, that when executed by the processing system, direct the processing system to at least establish the user input device as a trusted user input device based at least on the device identifier of the user input device, and persist an indication of the user input device as the trusted user input device. Responsive to at least one of the subsequent connection events involving the user input device, the program instructions further direct the processing system to determine based at least on the device identifier that the user input device comprises the trusted user input device, and subsequently bypass a passkey for sign-in of the user identity.

Example 17: A gaming console sign-in service, comprising a pairing entity configured to receive gaming controller identifiers responsive to coupling of gaming controllers to a gaming console, and a persistence entity configured to store correlations between the gaming controllers and user accounts employed for sign-in on the gaming console. The pairing entity is configured to initiate sign-in processes for ones of the user accounts on the gaming console responsive to connection events between the gaming console and correlated ones of the gaming controllers.

Example 18: The gaming console sign-in service of Example 17, comprising the pairing entity configured to present user interface elements to allow users of the gaming console to establish the correlations between the gaming controllers and the user accounts.

Example 19: The gaming console sign-in service of Examples 17-18, comprising a network interface configured to receive from a storage service at least a further correlation established on another gaming console between a further gaming controller and a further user account. The persistence entity is configured to store the further correlation for sign-in using the further user account on the gaming console responsive to an associated connection event involving the further gaming controller on the gaming console.

Example 20: The gaming console sign-in service of Examples 17-19, comprising the persistence entity configured to transfer the correlations between the gaming controllers and the user accounts for delivery to a remote storage service, where the remote storage service can provide the correlations for sign-in of the user accounts on other gaming consoles responsive to connection events of the gaming controllers on the other gaming consoles.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the subject matter of this application. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   in a user device, detecting a connection event resultant from coupling a user input device to the user device over a communication link;
   receiving a device identifier provided by the user input device over the communication link, wherein the device identifier comprises a unique identifier assigned to the user input device;
   establishing a persistent correlation between the device identifier assigned to the user input device and a user account, wherein the persistent correlation indicates the user input device as a trusted user input device;
   transferring an indication of the persistent correlation between the user account and the device identifier to a storage service remote from the user device for use in a sign-in process on another user device responsive to an associated connection event for the user input device on the other user device; and
   responsive to a subsequent connection event on the user device, determining based at least on the device identifier that the user input device comprises the trusted user input device, performing a sign-in process on the user device with the user account, and based on the persistent correlation indicating the user device as the trusted user input device, bypassing a passkey for sign-in of the user account on the user device.

2. The method of claim 1, further comprising:
   detecting the subsequent connection event for the user input device after an associated power cycle of the user device, and responsively receiving the device identifier provided by the user input device;
   processing the device identifier against correlation data to determine that the device identifier is linked to the user account; and
   performing the sign-in process on the user device for the user account that comprises retrieving at least user customizations of the user input device stored in relation to the user account.

3. The method of claim 1, further comprising:
   receiving additional device identifiers provided by additional user input devices over associated communication links, wherein the additional device identifiers comprise unique identifiers assigned to the additional user input devices; and
   responsive to the connection events, performing sign-in processes on the additional user devices with additional user accounts based on persistent correlations established between the additional device identifiers assigned to the additional user input device and the additional user accounts.

4. The method of claim 3, further comprising:
   based at least on the ones of the additional user input devices not being linked, prompting users to perform linking processes for the ones of the additional user input devices to the additional user accounts of the users, wherein the linking processes persist correlations between the ones of the additional user input devices and the additional user accounts over at least one power cycle of the user device.

5. The method of claim 3, further comprising:
   based at least on the ones of the additional user input devices not being linked, communicating with one or more storage services remote from the additional user devices to retrieve further correlation data indicating previously established links between the ones of the additional user input devices and the additional user accounts on at least a further user device and to retrieve at least user customizations of the ones of the additional user input devices stored in relation to the additional user accounts; and
   persisting at least one of the previously established links on the user device.

6. The method of claim 1,
   wherein the sign-in process on the other user device further comprises at least retrieving one or more user customizations of the user input device stored in relation to the user account by the storage service.

7. The method of claim 1,
   wherein the sign-in process on the other user device further comprises:
   determining that the device identifier is not linked with any user account on the other user device and responsively querying the storage service to retrieve an indication of the persistent correlation established between the device identifier assigned to the user input device and the user account; and
   performing a sign-in process on the other user device with the user account.

8. The method of claim 1, further comprising:
   establishing the persistent correlation between the user account on the user device and the device identifier by at least providing a user interface on the user device to allow a user to link the user account with the user input device corresponding to the device identifier.

9. A computing apparatus comprising:
one or more computer readable storage media;
a processing system operatively coupled with the one or more computer readable storage media; and
program instructions stored on the one or more computer readable storage media, that when executed by the processing system, direct the processing system to at least:
detect a connection event resultant from coupling a user input device to a user device over a communication link;
receive a device identifier provided by the user input device over the communication link, wherein the device identifier comprises a unique identifier assigned to the user input device;
establish a persistent correlation between the device identifier assigned to the user input device and a user account, wherein the persistent correlation indicates the user input device as a trusted user input device;
transfer an indication of the persistent correlation between the user account and the device identifier to a storage service remote from the user device for use in a sign-in process on another user device responsive to an associated connection event for the user input device on the other user device; and
responsive to a subsequent connection event on the user device, determine based at least on the device identifier that the user input device comprises the trusted user input device, perform a sign-in process on the user device with the user account, and based on the persistent correlation indicating the user device as the trusted user input device, bypass a passkey for sign-in of the user account on the user device.

10. The computing apparatus of claim 9, comprising further program instructions, that when executed by the processing system, direct the processing system to at least:
detect the subsequent connection event for the user input device after an associated power cycle of the user device, and responsively receive the device identifier provided by the user input device;
process the device identifier against correlation data to determine that the device identifier is correlated to the user account; and
perform the sign-in process on the user device for the user account that comprises retrieving at least user customizations of the user input device stored in relation to the user account.

11. The computing apparatus of claim 9, comprising further program instructions, that when executed by the processing system, direct the processing system to at least:
receive additional device identifiers provided by additional user input devices over associated communication links, wherein the additional device identifiers comprise unique identifiers assigned to the additional user input devices; and
responsive to the connection events, perform sign-in processes on the additional user devices with additional user accounts based on persistent correlations established between the additional device identifiers assigned to the additional user input device and the additional user account.

12. The computing apparatus of claim 11, comprising further program instructions, that when executed by the processing system, direct the processing system to at least:
based at least on the ones of the additional user input devices not being correlated, prompt users to perform linking processes for the ones of the additional user input devices to the additional user accounts of the users, wherein the linking processes persistently link the ones of the additional user input devices to the additional user accounts over at least one power cycle of the user device.

13. The computing apparatus of claim 11, comprising further program instructions, that when executed by the processing system, direct the processing system to at least:
based at least on the ones of the additional user input devices not being correlated, communicate with one or more storage services remote from the additional user devices to retrieve further correlation data indicating previously established correlations between the ones of the additional user input devices and the additional user accounts on at least a additional user device and to retrieve at least user customizations of the ones of the additional user input devices stored in relation to the additional user accounts; and
persist at least one of the previously established correlations on the user device.

14. The computing apparatus of claim 9,
wherein the sign-in process on the other user device further comprises at least retrieving one or more user customizations of the user input device stored in relation to the user account by the storage service.

15. The computing apparatus of claim 9, comprising further program instructions, that when executed by the processing system, direct the processing system to at least:
establish the persistent correlation between the user account on the user device and the device identifier by at least providing a user interface on the user device to allow a user to link the user account with the user input device corresponding to the device identifier.

16. A gaming console sign-in system, comprising:
a pairing entity configured to receive gaming controller identifiers responsive to connection of gaming controllers to a gaming console, wherein the gaming controller identifiers comprise unique identifiers assigned to each of the gaming controllers;
a user interface configured to prompt users to establish persistent correlations between user accounts of the users and the gaming controller identifiers for automatic sign-in of the users on the gaming console responsive to receipt of the gaming controller identifiers resultant from subsequent connection of the gaming controllers to the gaming console over associated communication links, wherein the persistent correlations indicate the gaming controllers as trusted gaming controllers; and
a persistence entity configured to provide indications of the persistent correlations between the user accounts and the gaming controller identifiers to a storage service remote from the gaming console for use in signing on the users automatically via the user accounts on at least another gaming console responsive to detecting the gaming controller identifiers after connecting the gaming controllers to the other gaming console over communication links established with the other gaming console, wherein based at least on identifying the gaming controllers as the trusted gaming controllers, passkeys are bypassed for sign-in of the user accounts on the other gaming console.

17. The gaming console sign-in system of claim 16, comprising:
the pairing entity configured to present user interface elements to allow users of the gaming console to establish the persistent correlations between the gaming controllers and the user accounts.

18. The gaming console sign-in system of claim 16, comprising:
a network interface configured to receive from the storage service at least an additional correlation established on an additional gaming console between an additional gaming controller and an additional user account;
the persistence entity configured to store the additional correlation for sign-in using the additional user account on the gaming console responsive to an associated connection event over a communication link between the additional gaming controller on the gaming console.

19. The gaming console sign-in system of claim 16, comprising:
the persistence entity configured to transfer indications of the persistent correlations between the gaming controllers and the user accounts for delivery to the storage service for sign-in of the user accounts on additional gaming consoles responsive to connection events over communication links established between the additional gaming consoles and the gaming controllers.

* * * * *